United States Patent
Zhao et al.

(10) Patent No.: US 12,538,260 B2
(45) Date of Patent: Jan. 27, 2026

(54) METHOD FOR POSITIONING, TERMINAL DEVICE AND POSITIONING DEVICE

(71) Applicant: QUECTEL WIRELESS SOLUTIONS CO., LTD., Shanghai (CN)

(72) Inventors: Zheng Zhao, Shanghai (CN); Ling Lyu, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/266,846

(22) Filed: Jul. 11, 2025

(65) Prior Publication Data

US 2025/0344182 A1    Nov. 6, 2025

Related U.S. Application Data

(63) Continuation of application No. PCT/CN2023/134166, filed on Nov. 24, 2023.

(51) Int. Cl.
| | |
|---|---|
| *H04W 24/10* | (2009.01) |
| *H04L 5/00* | (2006.01) |
| *H04W 64/00* | (2009.01) |

(52) U.S. Cl.
CPC .......... *H04W 64/00* (2013.01); *H04L 5/0051* (2013.01); *H04W 24/10* (2013.01)

(58) Field of Classification Search
CPC ...... H04W 64/00; H04W 24/10; H04L 5/0051
See application file for complete search history.

(56) References Cited

U.S. PATENT DOCUMENTS

| | | | |
|---|---|---|---|
| 2022/0015058 A1* | 1/2022 | Li | G01S 5/0236 |
| 2025/0024415 A1* | 1/2025 | Li | H04W 64/00 |

FOREIGN PATENT DOCUMENTS

| | | | |
|---|---|---|---|
| WO | WO 2023186135 A1 | 10/2023 | |

OTHER PUBLICATIONS

International Search Report and Written Opinion in International Appln. No. PCT/CN2023/134166, mailed on Jul. 17, 2024, 9 pages (with partial English translation).

* cited by examiner

*Primary Examiner* — Chuong A Ngo
(74) *Attorney, Agent, or Firm* — Fish & Richardson P.C.

(57) ABSTRACT

The present disclosure provides a method for positioning, a terminal device, and a positioning device. One example method includes: receiving a first reference signal transmitted by a first transmission point; measuring the first reference signal to obtain a first phase observation value; receiving a second reference signal transmitted by a second transmission point; measuring the second reference signal to obtain a second phase observation value; and determining a phase difference based on the first phase observation value and the second phase observation value, wherein the phase difference is used to determine a position of a terminal device.

20 Claims, 4 Drawing Sheets

METHOD FOR POSITIONING, TERMINAL DEVICE AND POSITIONING DEVICE

CROSS-REFERENCE TO RELATED APPLICATIONS

This application is a continuation of International Application No. PCT/CN2023/134166, filed on Nov. 24, 2023, the disclosure of which is hereby incorporated by reference in its entirety.

TECHNICAL FIELD

The present disclosure relates to the field of communication technology, and more specifically, to a method for positioning, a terminal device, and a positioning device.

BACKGROUND

To improve positioning accuracy, carrier phase difference (CPD) technology or real-time kinematic (RTK) positioning technology has been developed. In the CPD or RTK technology, most of errors in the signal propagation process can be eliminated by differential processing of phase observations of different transmission points, thereby enhancing positioning accuracy.

However, in some scenarios, the above-mentioned technologies still suffer from positioning errors. There is currently no clear solution to reduce the positioning errors.

SUMMARY OF THE INVENTION

The present disclosure provides a method for positioning, a terminal device, and a positioning device. The following aspects of the present disclosure are introduced below.

In a first aspect, a method for positioning is provided. The method includes: receiving, by a terminal device, a first reference signal transmitted by a first transmission point; measuring, by the terminal device, the first reference signal to obtain a first phase observation value; receiving, by the terminal device, a second reference signal transmitted by a second transmission point; measuring, by the terminal device, the second reference signal to obtain a second phase observation value; and determining, by the terminal device, a phase difference based on the first phase observation value and the second phase observation value. The phase difference is configured for positioning of the terminal device, where a reception time of the first reference signal is a first time instance, a reception time of the second reference signal is a second time instance, and a time interval between the first time instance and the second time instance is less than or equal to a predetermined duration.

In a second aspect, a method for positioning is provided. The method includes: receiving, by a positioning device, a phase difference transmitted by a terminal device, the phase difference being determined based on a first phase observation value and a second phase observation value, the first phase observation value being obtained by the terminal device measuring a first reference signal transmitted by a first transmission point, the second phase observation value being obtained by the terminal device measuring a second reference signal transmitted by a second transmission point; and positioning, by the positioning device, the terminal device based on the phase difference, where a reception time of the first reference signal is a first time instance, a reception time of the second reference signal is a second time instance, and a time interval between the first time instance and the second time instance is less than or equal to a predetermined duration.

In a third aspect, a terminal device is provided. The terminal device includes: a receiving unit configured to receive a first reference signal transmitted by a first transmission point and a second reference signal transmitted by a second transmission point; a measuring unit configured to measure the first reference signal to obtain a first phase observation value, and measure the second reference signal to obtain a second phase observation value; and a determining unit configured to determine a phase difference based on the first phase observation value and the second phase observation value. The phase difference is configured for positioning of the terminal device, where a reception time of the first reference signal is a first time instance, a reception time of the second reference signal is a second time instance, and a time interval between the first time instance and the second time instance is less than or equal to a predetermined duration.

In a fourth aspect, a positioning device is provided. The positioning device includes: a receiving unit configured to receive a phase difference transmitted by a terminal device, the phase difference being determined based on a first phase observation value and a second phase observation value, the first phase observation value being obtained by the terminal device measuring a first reference signal transmitted by a first transmission point, the second phase observation value being obtained by the terminal device measuring a second reference signal transmitted by a second transmission point; and a positioning unit configured to position the terminal device based on the phase difference, where a reception time of the first reference signal is a first time instance, a reception time of the second reference signal is a second time instance, and a time interval between the first time instance and the second time instance is less than or equal to a predetermined duration.

In a fifth aspect, a terminal device is provided. The terminal device includes a memory, a processor, and a communication interface. The memory is configured to store a program, and the processor is configured to call the program stored in the memory to execute the method as described in the first aspect.

In a sixth aspect, a positioning device is provided. The positioning device includes a memory, a processor, and a communication interface. The memory is configured to store a program, and the processor is configured to call the program stored in the memory to execute the method as described in the second aspect.

In a seventh aspect, an apparatus is provided. The apparatus includes a processor configured to call a program from a memory to execute the method as described in the first aspect.

In an eighth aspect, an apparatus is provided. The apparatus includes a processor configured to call a program from a memory to execute the method as described in the second aspect.

In a ninth aspect, a chip is provided. The chip includes a processor configured to call a program from a memory to cause a device equipped with the chip to execute the method as described in the first aspect.

In a tenth aspect, a chip is provided. The chip includes a processor configured to call a program from a memory to cause a device equipped with the chip to execute the method as described in the second aspect.

In an eleventh aspect, a computer-readable storage medium is provided. The computer-readable storage medium stores a program, where the program is configured to cause a computer to execute the method as described in the first aspect.

In a twelfth aspect, a computer-readable storage medium is provided. The computer-readable storage medium stores a program, where the program is configured to cause a computer to execute the method as described in the second aspect.

In a thirteenth aspect, a computer program product is provided. The computer program product includes a program configured to cause a computer to execute the method as described in the first aspect.

In a fourteenth aspect, a computer program product is provided. The computer program product includes a program configured to cause a computer to execute the method as described in the second aspect.

In a fifteenth aspect, a computer program is provided. The computer program is configured to cause a computer to execute the method as described in the first aspect.

In a sixteenth aspect, a computer program is provided. The computer program is configured to cause a computer to execute the method as described in the second aspect.

In the present disclosure, the measurement times of the reference signals from different transmission points are controlled by the terminal device so that the terminal device can measure the reference signals from different transmission points within a relatively short time range, thereby reducing the error in the phase difference (or phase observation difference value) due to the deviation in the initial phase of the terminal device, which facilitates improving positioning accuracy.

DETAILED DESCRIPTION OF THE EMBODIMENTS

The following is a detailed description of the technical solutions of the present disclosure with reference to the accompanying drawings.

Figure 1:
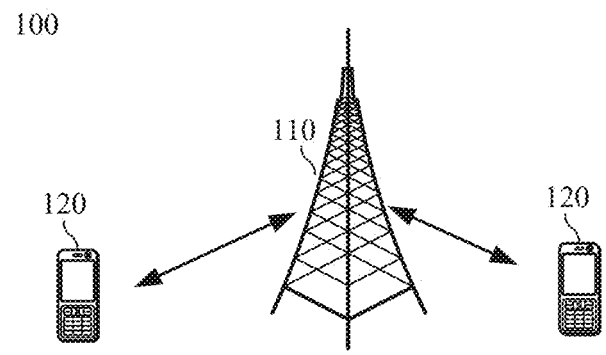
FIG. 1 illustrates a wireless communication system 100 applied in embodiments of the present disclosure.

FIG. 1 illustrates a wireless communication system 100 applied in the embodiments of the present disclosure. The wireless communication system 100 includes a network device 110 and a terminal device 120. The network device 110 may be a device that communicates with the terminal device 120, and can provide communication coverage for a specific geographical area.

FIG. 1 exemplarily illustrates one network device and two terminal devices. In some embodiments, the wireless communication system 100 may include multiple network devices, and other number of terminal devices may be within the coverage range of each network device, which is not limited in the present disclosure.

In some embodiments, the wireless communication system 100 may further include other network entities such as a network controller and a mobile management entity.

It should be understood that the technical solutions of the present disclosure may be applied to various communication systems, such as a 5G system, New Radio (NR), a long term evolution (LTE) system, a frequency division duplex (FDD) system, and a time division duplex (TDD) system. The technical solutions of the present disclosure may also be applied to a future communication system such as a 6G system and a satellite communication system.

The terminal device in the embodiments of the present disclosure may also be referred to as user equipment (UE), access terminal, user unit, user station, mobile station (MS), mobile terminal (MT), remote station, remote terminal, mobile device, user terminal, terminal, wireless communication device, user agent, or user device. The terminal device in the embodiments of the present disclosure may be a device that provides voice and/or data connectivity to users and may be used to connect people, objects, and machines, such as handheld devices with wireless connectivity functions and in-vehicle devices. The terminal device in the embodiments of the present disclosure may be a mobile phone, tablet computer (Pad), laptop, handheld computer, mobile internet device (MID), wearable device, virtual reality (VR) device, augmented reality (AR) device, wireless terminal in industrial control, wireless terminal in self-driving, wireless terminal in remote medical surgery, wireless terminal in smart grid, wireless terminal in transportation safety, wireless terminal in smart city, wireless terminal in smart home, etc. Optionally, the UE may be used as a base station. For example, the UE may act as a scheduling entity that provides sidelink signals between UEs in V2X or D2D. For example, cellular phones and cars communicate with each other using sidelink signals. Cellular phones and smart home devices communicate with each other without relaying communication signals through a base station.

The network device in the embodiments of the present disclosure may be a device configured for communication with the terminal device. The network device may also be referred to as an access network device or a radio access network device, such as a base station. The network device in the embodiments of the present disclosure may be a wireless access network (RAN) node (or device) that connects the terminal device to the wireless network. The base station may broadly cover the following names or be interchangeable with them: NodeB, evolved NodeB (eNB), next generation NodeB (gNB), relay station, transmitting and receiving point (TRP), transmitting point (TP), master station MeNB, secondary station SeNB, multi-standard radio (MSR) node, home base station, network controller, access node, wireless node, access point (AP), transmission node, transceiver node, baseband unit (BBU), remote radio unit (RRU), active antenna unit (AAU), remote radio head (RRH), central unit (CU), distributed unit (DU), positioning node, etc. The base station may be a macro base station, micro base station, relay node, donor node, or similar, or a combination thereof. The base station may also refer to a communication module, modem, or chip installed in the aforementioned devices or apparatuses. The base station may also be a mobile switching center, as well as devices that perform the base station function in device-to-device (D2D), vehicle-to-everything (V2X), machine-to-machine (M2M) communication, network-side devices in 6G networks, and devices that perform the base station function in future communication systems. The base station may support networks with the same or different access technologies. The embodiments of the present disclosure do not limit the specific technology and specific device form used by the network device.

The base station may be either fixed or mobile. For example, helicopters or drones may be configured to act as mobile base stations, with at least one cells moving according to the location of the mobile base station. In other examples, helicopters or drones may be configured to communicate with another base station.

In some deployments, the network device in the embodiments of the present disclosure may refer to the CU or DU, or the network device includes both the CU and DU. The gNB may further include the AAU.

Network devices and terminal devices may be deployed on land, including indoors or outdoors, handheld or in-vehicle; they may also be deployed on water surfaces; and they may be deployed on aircraft, balloons, or satellites in the air. The embodiments of the present disclosure do not limit the scenarios in which the network devices and terminal devices are deployed.

It should be understood that the functions of the communication devices in the present disclosure may also be implemented by software running on hardware, or by virtualized functions instantiated on a platform (such as a cloud platform).

The most commonly used positioning method currently is to use the Global Navigation Satellite System (GNSS) to locate a terminal device. GNSS can locate the terminal device by relying on a three-dimensional coordinate system. For example, the position coordinates of the terminal device may be obtained by calculating the distance between each satellite (such as four satellites) and the terminal device.

However, satellite positioning is subject to errors, which include both internal system errors and external system errors. These errors include an error caused by the penetration of satellite signals through the ionosphere, an error caused by the penetration of satellite signals through the troposphere, and an error caused by the Doppler effect due to the high-speed movement of satellites. These errors affect the accuracy and reliability of the positioning system. To better eliminate the above errors and improve positioning accuracy, Real-Time Kinematic (RTK) positioning technology has emerged. The RTK technology may also be referred to as carrier phase positioning technology. The RTK technology may be understood as a technology that assists GNSS. Since the RTK technology can provide real-time centimeter-level positioning accuracy within the working area, the RTK technology has been widely used in applications such as autonomous driving, drones, precision agriculture, and industrial robots.

The RTK technology is a differential method for processing two observation data in real time. By differentially processing the two observation data, most of the above errors can be eliminated, such as a satellite clock error, an ephemeris error, an ionospheric errors, and a tropospheric error.

The two observation data mentioned above may be observation data for a terminal device with respect to two transmission points, or observation data for two terminal devices with respect to the same transmission point. Specific limitations are not provided in the embodiments of the present disclosure. The following introduces these two scenarios separately.

The transmission point mentioned above may be a satellite or a base station. The terminal device mentioned above may be a reference station or a rover.

Scenario One

The RTK system includes two terminal devices, which may be a reference station and a rover respectively. The reference station, serving as the measurement benchmark, is typically fixed in an open area with a clear view. The three-dimensional coordinate information of the reference station is generally known. The rover may be a device that requires positioning. The rover may also be referred to as a mobile station or user station. Usually, a distance between the reference station and the rover does not exceed 20 kilometers. Each of the reference station and the rover may include a receiver for observing and receiving a reference signal transmitted from a transmission point. The RTK positioning process is introduced below in conjunction with FIG. 2.

The reference station receives a reference signal transmitted from a transmission point 1 and measures the reference signal to obtain first observation data. The reference station then sends the first observation data in real time to a rover via a radio (or data link). The rover also receives a reference signal transmitted from the transmission point 1 and measures the reference signal to obtain second observation data. According to the principle of relative positioning, the rover performs a real-time differential calculation on the first and second observation data to obtain differential data. In some embodiments, the reference station and the rover may each measure the reference signal at multiple time instances to obtain multiple sets of first and second observation data at multiple time instances. The rover may then perform differential processing on the multiple sets of first and second observation data to obtain multiple differential data.

In some embodiments, the reference station may also send its observation data with respect to a transmission point 2 to the rover. The rover then performs a differential calculation on its own observation data with respect to the transmission point 2 and the reference station's observation data with respect to the transmission point 2 to obtain differential data. The calculations for other transmission points (such as transmission points 3 and 4) are similar. Based on these differential data, a three-dimensional coordinate of the rover and its accuracy can be determined.

Figure 2:
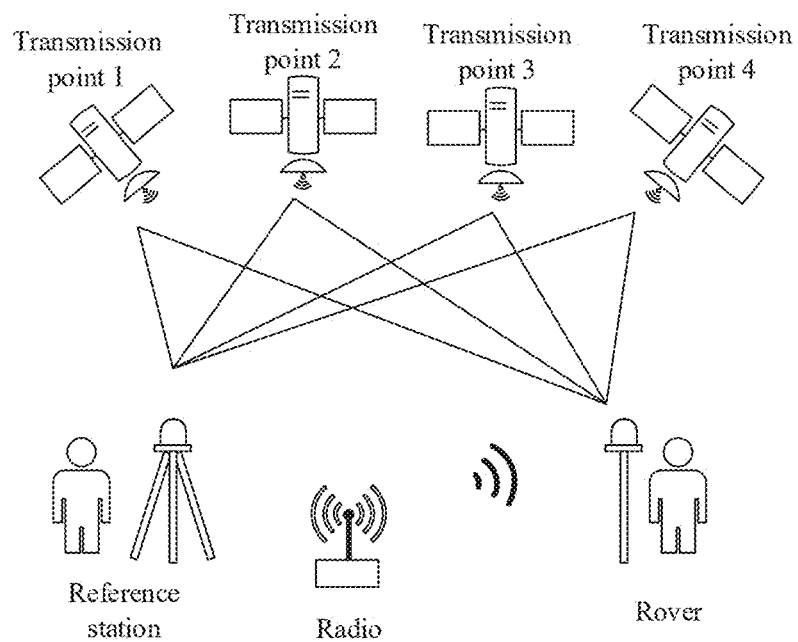
FIG. 2 illustrates a traditional RTK positioning method.

The RTK technology shown in FIG. 2 may be referred to as traditional RTK technology. The traditional RTK technology is simple to implement and cost-effective. However, this method is limited by the distance between the reference station and the rover. The greater the distance between the reference station and the rover, the larger the difference in error factors, which leads to a decrease in positioning accuracy. Additionally, in response to the distance between the reference station and the rover exceeding a communication range of the radio, the RTK system would not be able to function.

To overcome the limitations of the traditional RTK technology, network RTK technology has been proposed.

Figure 3:
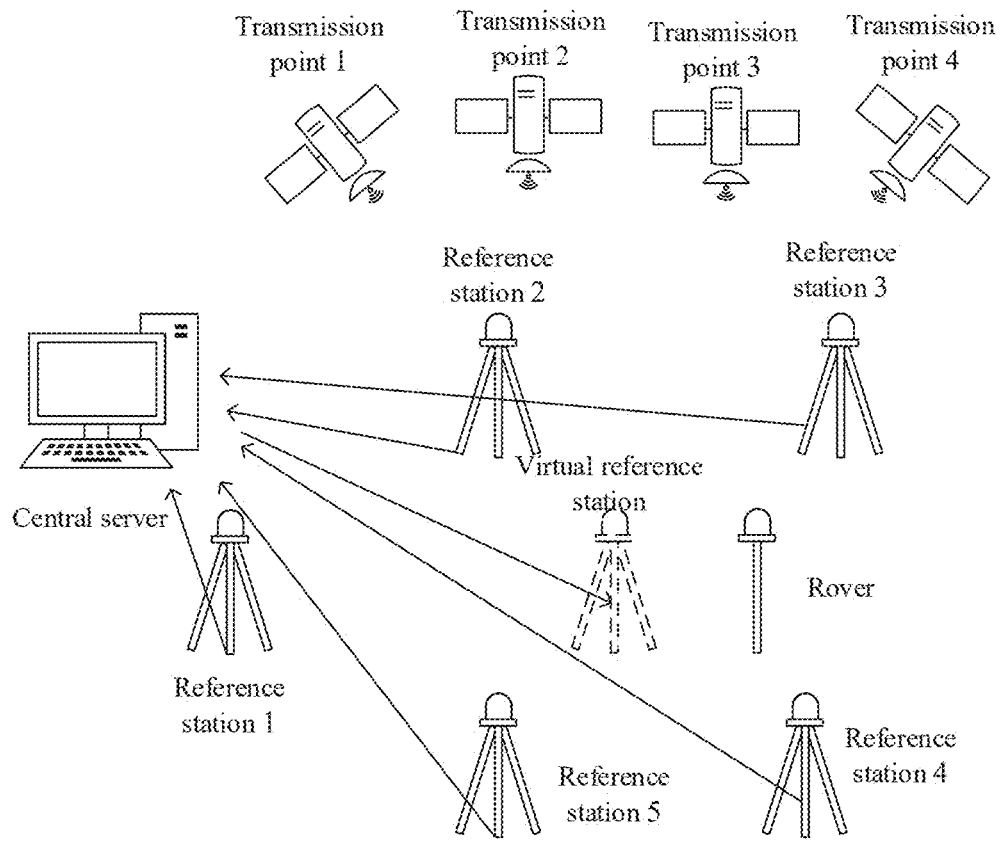
FIG. 3 illustrates a network RTK positioning method.

As shown in FIG. 3, the network RTK system may include multiple reference stations (such as three or more reference stations), forming a reference station network. Compared with the traditional RTK technology, the network RTK technology actually replaces the single-point GNSS error model with a regional GNSS network error model. The reference station network composed of multiple reference stations may send data to a central server, which may then simulate a virtual reference station based on the received data. As shown in FIG. 3, Reference Stations 1 to 5 form a virtual reference station. Therefore, the network RTK technology may also be referred to as virtual reference station technology.

For the rover, it may receive data sent from the virtual reference station and complete the final measurement calculations based on the data sent from the virtual reference station.

The reference station may be implemented by a ground-based base station, that is, the base station may serve as a reference station. Since base stations have already achieved seamless coverage, Network RTK has also substantially achieved seamless coverage.

Scenario Two

Figure 4:
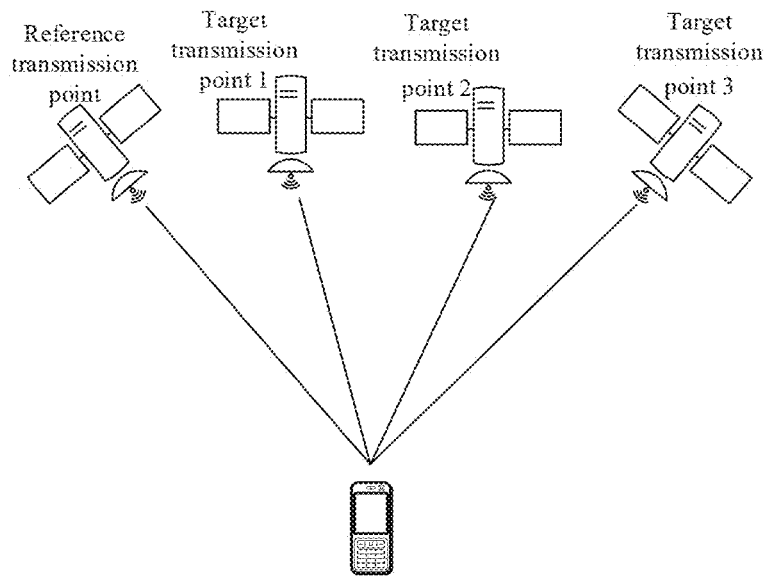
FIG. 4 illustrates another RTK positioning method.

Referring to FIG. 4, the RTK system may include one terminal device, a reference transmission point, and at least one target transmission point. The terminal device may receive the reference signal transmitted from the reference transmission point and measure it to obtain the first observation data. The terminal device may also receive the reference signal transmitted from target transmission point 1 and measure it to obtain the second observation data. The terminal device may perform differential processing on the first and second observation data to obtain differential data. In some embodiments, the terminal device may measure the reference signal at multiple time instances to obtain the first and second observation data at different time instances, and perform differential processing on the first and second observation data to obtain multiple sets of differential data.

In some embodiments, the terminal device may also receive the reference signal transmitted from target transmission point 2 and measure it to obtain the third observation data. The terminal device may perform differential processing on the third and first observation data to obtain differential data. The calculation method for other target transmission points (such as target transmission point 3) is similar. Based on these differential data, the three-dimensional coordinates of the terminal device and their accuracy can be calculated.

Typically, during the propagation of communication signals, various errors such as satellite errors, atmospheric errors, multipath errors, and device errors are carried, leading to inaccurate data resolution and consequently inaccurate positioning. Among these, the most significant error affecting positioning is the atmospheric error. Taking satellite communication as an example, since navigation satellites are located more than 20,000 kilometers above the ground, for Scenario One, in response to the distance between the reference station and the rover being relatively small (e.g., within 10 kilometers), most of the errors carried by the reference station and the rover have temporal and spatial correlation. For instance, it can be assumed that the atmospheric errors carried by the reference station and the rover are substantially the same. If the reference station and the rover simultaneously observe the navigation satellites and perform differential calculations on the observation data received by the reference station and the rover, the vast majority of errors (such as atmospheric errors and satellite errors) can be substantially eliminated.

For Scenario Two, since navigation satellites are located more than 20,000 kilometers above the ground, it can be assumed that the atmospheric errors carried by different satellites are substantially the same. If the terminal device performs differential calculations on the observation data for different satellites, the vast majority of errors (such as atmospheric errors and satellite errors) can be substantially eliminated.

The RTK technology can achieve centimeter-level positioning accuracy through differential computation and is widely used in fields requiring high-precision dynamic positioning. For example, for the L1 band of GPS with a wavelength of about 0.19 m and low measurement noise, the influence of multipath effects can be neglected. Therefore, the RTK technology has a high measurement accuracy, which can reach 2 mm.

The above description is based on satellite communication. Similarly, if the transmission point is a base station, most communication errors can be eliminated by differential computation, improving positioning accuracy.

The above-mentioned observation data may be phase observation values (also known as phase observables) or pseudorange observation values. The following mainly takes the observation data as phase observation values for illustration. Taking phase observation values as an example, the above-mentioned observation data may be referred to as reference signal carrier phase (RSCP), and the above-mentioned differential data may be referred to as reference signal carrier phase difference (RSCPD). The positioning technology using RSCPD may also be called CPD technology.

The following takes Scenario Two as an example to introduce the solutions of the present disclosure.

The terminal device may measure reference signals transmitted from different transmission points, calculate a reference signal carrier phase difference (RSCPD), and report the RSCPD to the positioning device. The positioning device may then determine the location information of the terminal device based on the RSCPD.

For example, the terminal device may receive a reference signal transmitted from a transmission point i to obtain a reference signal carrier phase (RSCP) of the transmission point i, which is denoted as $RSCP_i$. The terminal device may further receive a reference signal transmitted from a transmission point j to obtain the $RSCP_j$ of the transmission point j. Further, the terminal device may determine: $RSCPD=RSCP_j-RSCP_i$.

Due to the influence of the internal hardware of the terminal device (such as the oscillator), the initial phase of the terminal device may vary at different time instances. In response to the terminal device measuring the reference signals transmitted from different transmission points at different times, the deviation in the initial phase of the terminal device may cause errors in the measured RSCPD, leading to positioning errors.

Based on this, the present disclosure provides a method for positioning, in which by controlling the measurement times of the reference signals from different transmission points by the terminal device. This allows the terminal device to measure the reference signals from different transmission points within a relatively short time range, thereby reducing the error in the phase observation difference (or phase difference) value, which is conducive to improving positioning accuracy.

In the embodiments of the present disclosure, the transmission points (such as the first transmission point and the second transmission point) may be satellites or base stations. The terminal device in the embodiments of the present disclosure may be a reference station or a rover. In some embodiments, the terminal device may also be a positioning reporting unit (PRU). The positioning device in the embodiments of the present disclosure may also be referred to as a positioning server. For example, the positioning device may be a location management function (LMF).

Figure 5:
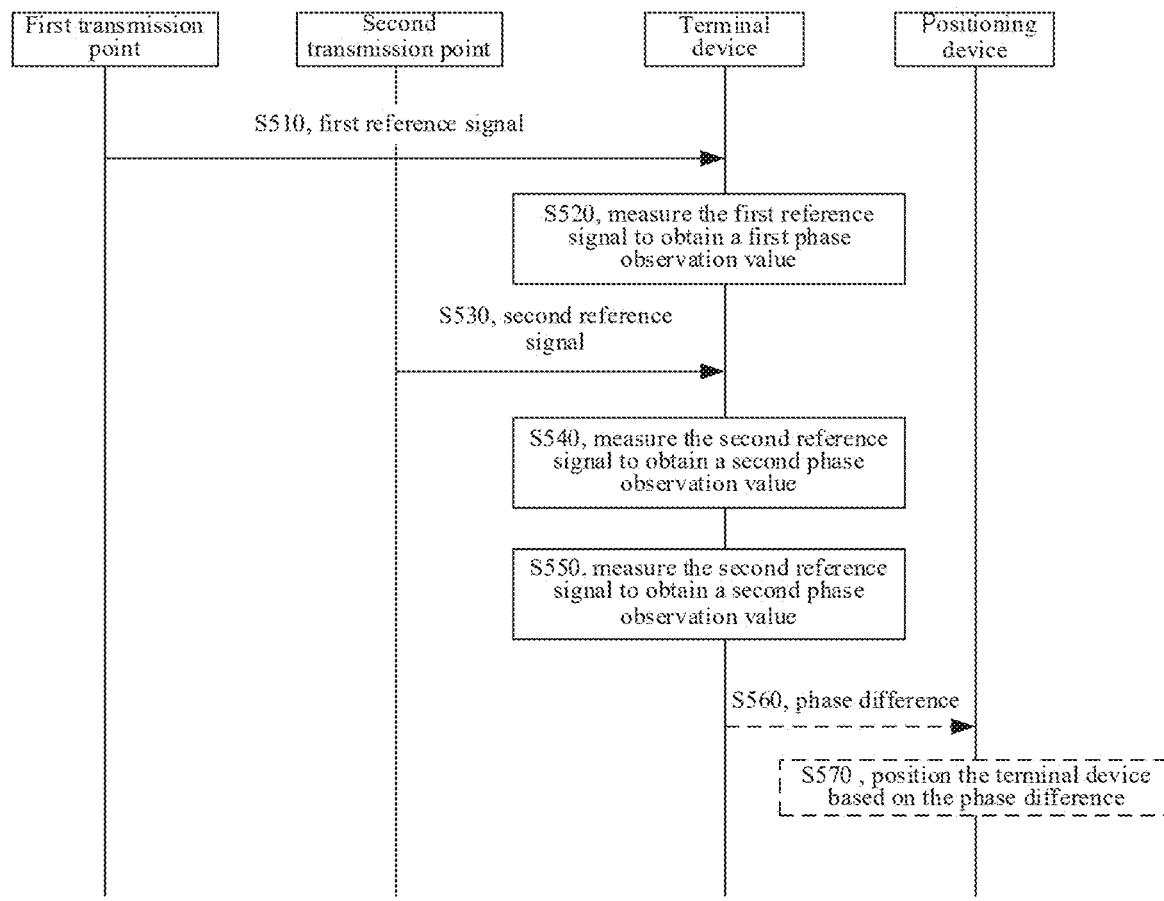
FIG. 5 illustrates a flowchart of a method for positioning according to an embodiment of the present disclosure.

FIG. 5 illustrates a method for positioning according to an embodiment of the present disclosure.

In operation S510, the terminal device receives a first reference signal transmitted by a first transmission point. The first reference signal may be a pilot signal, such as a positioning reference signal (PRS).

In operation S520, the terminal device measures the first reference signal to obtain a first phase observation value. The first phase observation value may be a reference signal carrier phase (RSCP) described above. The first phase observation value may be understood as a signal phase when the terminal device receives the first reference signal.

In operation S530, the terminal device receives a second reference signal transmitted by a second transmission point. The second reference signal may also be a pilot signal.

In operation S540, the terminal device measures the second reference signal to obtain a second phase observation value. The second phase observation value may also be a reference signal carrier phase (RSCP) described above. The first phase observation value may be understood as a signal phase when the terminal device receives the first reference signal.

In operation S550, the terminal device determines a phase difference based on the first phase observation value and the second phase observation value. For example, the terminal device may perform differential computation on the first and second phase observation values to obtain the phase difference. In some possible implementations, the phase difference is equal to the second phase observation value minus the first phase observation value. The phase difference may be the reference signal carrier phase difference (RSCPD) described above.

The phase difference may be configured for positioning of the terminal device. For example, the terminal device may send the phase difference to a positioning device, which can determine the position of the terminal device based on the phase difference.

In some embodiments, the method shown in FIG. 5 may further include operations S560 and S570.

In operation S560, the terminal device sends the phase difference to the positioning device.

In operation S570, the positioning device positions the terminal device based on the phase difference.

In some embodiments, one of the first and second transmission points is a reference transmission point, and the other of the first and second transmission points is a target transmission point. For example, the first transmission point is a reference transmission point, and the second transmission point is a target transmission point. In another example, the first transmission point is a target transmission point, and the second transmission point is a reference transmission point.

In some embodiments, the terminal device may receive reference signals from the first transmission point at multiple time instances to obtain multiple first phase observation values and receive reference signals from the second transmission point at multiple time instances to obtain multiple second phase observation values. The terminal device may perform differential computations on the first and second phase observation values to obtain multiple phase differences.

In some embodiments, a reception time of the first reference signal is a first time instance, a reception time of the second reference signal is a second time instance, and a time interval between the first time instance and the second time instance is less than or equal to a predetermined duration.

In the embodiments of the present disclosure, the time interval between the first and second time instances is limited so that the terminal device can measure the reference signals transmitted by two transmission points within a short time range. This reduces the effect of the initial phase deviation of the terminal device on positioning accuracy, which facilitates improving the positioning accuracy.

The predetermined duration may be a duration predefined in a protocol or indicated to the terminal device by a network device through higher-layer signaling. For example, the network device may indicate the predetermined duration to the terminal device through higher-layer signaling.

It should be noted that the shorter the predetermined duration, the smaller the initial phase deviation of the terminal device, the smaller the effect on the positioning accuracy, and thus the higher the positioning accuracy.

The determination method of the predetermined duration is not specifically limited in the embodiments of the present disclosure.

As an example, the predetermined duration may be determined based on a first time unit. The first time unit may include at least one of subframe, slot, and symbol. For example, the predetermined duration may be determined based on subframes. The predetermined duration may has a subframe granularity, and may be 0 subframe, 1 subframe, 2 subframes, or the like. In some embodiments, the first time unit may also include at least one of the following: seconds, milliseconds, microseconds and the like.

If the predetermined duration is 0 subframe, it means that the first time instance and the second time instance are within the same subframe. If the predetermined duration is 1 subframe, it means that the subframe in which the first time instance is located and the subframe in which the second time instance is located differs by one subframe, and so on.

In some embodiments, the first time instance and the second time instance are within the same first time unit. For example, the first time instance and the second time instance are within the same subframe. For another example, the first time instance and the second time instance are within the same slot. For yet another example, the first time instance and the second time instance are within the same symbol. By limiting the first time instance and the second time instance in the same time unit, the time difference between the first time instance and the second time instance can be reduced, which is beneficial for improving positioning accuracy.

Taking as an example the first time instance and the second time instance being within the same subframe, if the terminal device receives, in subframe x, the reference signal transmitted by the first transmission point, the terminal device can detect, in the subframe x, the reference signal transmitted by the second transmission point. Alternatively, if the terminal device receives, in subframe y, the reference signal transmitted by the second transmission point, the terminal device can detect, in the subframe y, the reference signal transmitted by the first transmission point.

In some embodiments, in response to the first time instance and the second time instance being in different first time units, the terminal device may choose the first reference signal and the second reference signal that are closest in time to each other for measurement. For example, the second reference signal may be one of reference signals transmitted by the second transmission point that is closest in time to the reception time of the first reference signal. For another example, the first reference signal may be one of reference signals transmitted by the first transmission point that is closest in time to the reception time of the second reference signal.

For example, if the first reference signal transmitted by the first transmission point is used as a benchmark and the reception time of the first reference signal is the first time instance, when receiving a reference signal transmitted by the second transmission point, the terminal device may choose to receive the second reference signal at a time instance closest to the first time instance. Taking subframe as an example, the subframe in which the first time instance is located is subframe x, and the subframe in which the second time instance is located is subframe y. In subframes in which reference signals transmitted by the second transmission point are located, the subframe y is a subframe closest to the subframe x.

If the second reference signal transmitted by the second transmission point is used as a benchmark and the reception time of the second reference signal is the second time instance, when receiving a reference signal transmitted by the first transmission point, the terminal device may choose to receive the first reference signal at a time instance closest to the second time instance. Taking subframe as an example, the subframe in which the first time instance is located is subframe x, and the subframe in which the second time instance is located is subframe y. In subframes in which reference signals transmitted by the first transmission point are located, the subframe x is a subframe closest to the subframe y.

In some embodiments, in response to the time interval between the first time instance and the second time instance being greater than the predetermined duration, the terminal device may perform a first operation. The first operation may include at least one of the following: not sending the phase difference; sending the phase difference; sending the first phase observation value; and sending the second phase observation value. The following is a detailed introduction to the above contents of the first operation.

In some embodiments, in response to the time interval between the first time instance and the second time instance being greater than the predetermined duration, the terminal device may choose not to send the phase difference. Since the longer the time interval between the first time instance and the second time instance, the larger the initial phase deviation of the terminal device, and the larger the positioning error. In this case, the phase difference determined by the terminal device may not be suitable for positioning. Based on this consideration, the present disclosure may choose not to send the phase difference in response to the time interval between the first time instance and the second time instance being greater than the predetermined duration, thereby saving air interface resources.

In some embodiments, in response to the time interval between the first time instance and the second time instance being greater than the predetermined duration, the terminal device may send the phase difference. Although the phase difference determined by the terminal device may have a larger error, the terminal device may send the phase difference to the positioning device. The positioning device can calibrate the phase difference and use the calibrated phase difference for positioning, thereby improving the utilization rate of data.

In some embodiments, in response to the time interval between the first time instance and the second time instance being greater than the predetermined duration, the terminal device may send the first phase observation value to the positioning device. Although the phase difference determined by the terminal device may not be accurate, the first phase observation value is still accurate. The terminal device may send the first phase observation value to the positioning device to enable the positioning device to use the first phase observation value for positioning.

In some embodiments, in response to the time interval between the first time instance and the second time instance being greater than the predetermined duration, the terminal device may send the second phase observation value to the positioning device. Although the phase difference determined by the terminal device may not be accurate, the second phase observation value is still accurate. The terminal device may send the second phase observation value to the positioning device to enable the positioning device to use the second phase observation value for positioning.

The first operation may include any one or more of the above operations. For example, the first operation may include sending the first phase observation value and the second phase observation value. That is, in response to the time interval between the first time instance and the second time instance being greater than the predetermined duration, the terminal device may send the first phase observation value and the second phase observation value.

In some embodiments, the predetermined duration and the first time instance may be configured to determine a first time window. For example, the terminal device may determine the first time window based on the first time instance and the predetermined duration. The terminal device may detect the second reference signal within the first time window. In some possible implementations, the terminal device may obtain the first time window by offset of the predetermined duration relative to the first time instance as a benchmark. The offset may be a forward offset relative to the first time instance, a backward offset relative to the first time instance, or a forward and backward offset relative to the first time instance. In other possible implementations, the terminal device may first offset the first time instance by a predetermined value to obtain a target time instance, and then obtain the first time window by offset of the predetermined duration relative to the target time instance as a benchmark. The offset may be a forward offset relative to the target time instance, a backward offset relative to the target time instance, or a forward and backward offset relative to the target time instance.

In some embodiments, in response to the terminal device failing to detect the second reference signal within the first time window, the terminal device may send at least one of the first phase observation value and a timestamp corresponding to the first phase observation value to the positioning device. The positioning device may use the at least one of the first phase observation value and the timestamp corresponding to the first phase observation value for subsequent positioning. For example, a positioning server may use the first phase observation value in combination with other phase observation values measured by the terminal device at other time instances to calibrate the received data.

In some embodiments, assuming that the first transmission point is the reference transmission point and the second transmission point is the target transmission point, if the terminal device fails to detect the second reference signal within the first time window, it means that the terminal device has not detected the reference signal transmitted by the target transmission point, and the terminal device has received only the reference signal transmitted by the reference transmission point. Since the reference transmission point is a benchmark transmission point, the terminal device may send the first phase observation value corresponding to the reference transmission point to the positioning device, and the positioning device may use the first phase observation value for subsequent positioning.

Of course, in some embodiments, in response to the terminal device failing to detect the second reference signal within the first time window, the terminal device may also choose not to send the first phase observation value to the positioning device.

In some embodiments, the predetermined duration and the second time instance may be configured to determine a second time window. For example, the terminal device may determine the second time window based on the second time instance and the predetermined duration. The terminal device may detect the first reference signal within the second time window. In some possible embodiments, the terminal device may obtain the second time window by offset of the predetermined duration relative to the second time instance as a benchmark. The offset may be a forward offset relative to the second time instance, a backward offset relative to the second time instance, or a forward and backward offset relative to the second time instance. In other possible implementations, the terminal device may first offset the second time instance by a predetermined value to obtain a target time instance, and then obtain the second time window by offset of the predetermined duration relative to the target time instance as a benchmark. The offset may be a forward offset relative to the target time instance, a backward offset relative to the target time instance, or a forward and backward offset relative to the target time instance.

In some embodiments, if in response to the terminal device failing to detect the first reference signal within the second time window, the terminal device may perform a second operation. The second operation may include at least one of the following: not sending the second phase observation value; sending a first indication message configured to indicate detection failure; and sending a second indication message configured to indicate that the first reference signal is not contained in the second time window. Of course, in some embodiments, in response to the terminal device failing to detect the first reference signal within the second time window, the terminal device may send the second phase observation value to the positioning device.

Specific limitations are not provided in the present disclosure.

In some embodiments, assuming that the first transmission point is the reference transmission point and the second transmission point is the target transmission point, if the terminal device fails to detect the first reference signal within the second time window, it means that the terminal device has not detected the reference signal transmitted by the reference transmission point, and the terminal device has received only the reference signal transmitted by the target transmission point. In the absence of the phase observation value corresponding to the reference transmission point, the phase observation value corresponding to the target transmission point will be of little significance. Therefore, the terminal device may choose not to send the phase observation value corresponding to the target transmission point to the positioning device. Additionally, the terminal device may send at least one of the first indication message and the second indication message to the positioning device to notify the positioning device of the reason for not sending the first phase observation value.

In some embodiments, the terminal device may further send the following information to the positioning device: frequency drift rate over time, phase drift rate over time, and phase drift over time. The positioning device may use the above information to calibrate at least one of the received phase observation value and phase difference to improve positioning accuracy.

In some embodiments, the frequency of some hardware (such as an oscillator) of the terminal device may drift over time. The terminal device may calculate the frequency drift rate over time. In some possible implementations, the terminal device may calculate the phase drift over time based on the frequency drift rate over time. In other possible embodiments, the terminal device may convert the phase drift over time into a phase drift rate over time.

In some embodiments, in response to the positioning device receiving the frequency drift rate over time, the positioning device may calculate a phase drift over time based on the frequency drift rate over time and remove the phase drift over time from the phase difference to obtain the final phase difference. In other embodiments, in response to the positioning device receiving the phase drift over time, the positioning device may directly remove the phase drift over time from the phase difference to obtain the final phase difference. In other embodiments, in response to the positioning device receiving the phase drift rate over time, the positioning device may determine a corresponding phase drift based on the phase drift rate over time and then remove the phase drift over time from the phase difference to obtain the final phase difference. The phase difference after removing the phase drift over time is relatively accurate, thereby improving positioning accuracy.

In some embodiments, the phase drift over time in the phase difference may be removed by the terminal device itself. The terminal device may send the phase difference after removing the phase drift over time to the positioning device. The positioning device may directly use the phase difference for subsequent positioning. That is, the terminal device may determine the phase difference based on the first phase observation value, the second phase observation value, and the phase drift over time. The terminal device may calculate the phase change during the RSCP measurement interval and remove the phase change from the phase difference to obtain the final phase difference. For example, the final phase difference may be equal to the second phase observation value minus the first phase observation value and the phase change.

In some embodiments, both the first and second transmission points are reference transmission points, and a transmission point i is the target transmission point. The terminal device may have only measured a phase difference with the second transmission point as the reference transmission point. The positioning device may calculate a phase difference with the first transmission point as the reference transmission point based on the phase difference. For example, the terminal device has only measured a phase difference between the transmission point i and the second transmission point. The positioning device may determine a phase difference between the transmission point i and the first transmission point based on the phase difference.

For example, the phase difference may be determined by the following formula:

$$\phi^{i,1} = \phi^{i,2} - \phi^{1,2}$$

In the above formula, $\phi^{1,2}$ represents the phase difference between the first transmission point and the second transmission point, $\phi^{i,1}$ represents the phase difference between the transmission point i and the first transmission point, and $\phi^{i,2}$ represents the phase difference between transmission point i and the second transmission point. It can be seen from the formula that the phase error of the reference transmission point 2 is eliminated.

In the above embodiments, the positioning device needs to know the phase difference between the first transmission point and the second transmission point. In some cases, the terminal device may not measure or report the phase difference between the first transmission point and the second transmission point. Based on this, in some embodiments, the positioning device may send a request message to the first transmission point. The request message is configured to request the terminal device to send at least one of the following information: the phase difference between the first transmission point and the second transmission point (e.g., $\emptyset^{1,2}$), the first phase observation value, and the second phase observation value. After receiving the request message, the first transmission point may send at least one of the following information to the positioning device: the phase difference between the first transmission point and the second transmission point (e.g., $\emptyset^{1,2}$), the first phase observation value, and the second phase observation value.

The method embodiments of the present disclosure are described in detail above in conjunction with FIGS. 1 to 5, and device embodiments of the present disclosure are described in detail below in conjunction with FIGS. 6 to 8. It should be understood that the above description of the method embodiments corresponds to the description of the device embodiments. Therefore, parts of the device embodiments that are not described in detail can be referred to the preceding method embodiments.

Figure 6:
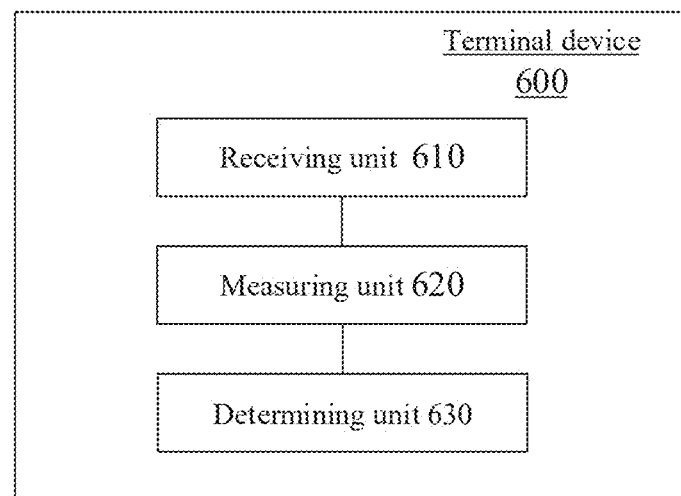
FIG. 6 illustrates a block diagram of a terminal device according to an embodiment of the present disclosure.

FIG. 6 illustrates a block diagram of a terminal device according to an embodiment of the present disclosure. The terminal device 600 shown in FIG. 6 may be any of the terminal devices described above. The terminal device 600 may include a receiving unit 610, a measuring unit 620, and a determining unit 630.

The receiving unit 610 is configured to receive a first reference signal transmitted by a first transmission point and a second reference signal transmitted by a second transmission point.

The measuring unit 620 is configured to measure the first reference signal to obtain a first phase observation value, and measure the second reference signal to obtain a second phase observation value.

The determining unit 630 is configured to determine a phase difference based on the first phase observation value and the second phase observation value, the phase difference being configured for positioning of the terminal device.

A reception time of the first reference signal is a first time instance, a reception time of the second reference signal is a second time instance, and a time interval between the first time instance and the second time instance is less than or equal to a predetermined duration.

In some possible implementations, the predetermined duration is determined based on a first time unit including at least one of the following: subframe, slot, and symbol.

In some possible implementations, the first time instance and the second time instance are within the same first time unit.

In some possible implementations, the first time instance and the second time instance are in different first time units. The second reference signal is one of reference signals transmitted by the second transmission point that is closest in time to the reception time of the first reference signal, or the first reference signal is one of reference signals transmitted by the first transmission point that is closest in time to the reception time of the second reference signal.

In some possible implementations, the terminal device further includes an execution unit. In response to the time interval between the first time instance and the second time instance being greater than the predetermined duration, the execution unit performs a first operation. The first operation includes at least one of the following: not sending the phase difference; sending the phase difference; sending the first phase observation value; and sending the second phase observation value.

In some possible implementations, the predetermined duration and the first time instance are configured to determine a first time window. The terminal device further includes a sending unit. In response to the terminal device failing to detect the second reference signal within the first time window, the sending unit sends at least one of the first phase observation value and a timestamp corresponding to the first phase observation value to the positioning device.

In some possible implementations, the predetermined duration and the second time instance are configured to determine a second time window. The terminal device further includes an execution unit. In response to the terminal device failing to detect the first reference signal within the second time window, the execution unit performs a second operation. The second operation includes at least one of the following: not sending the second phase observation value; sending a first indication message configured to indicate detection failure; and sending a second indication message configured to indicate that the first reference signal is not contained in the second time window.

In some possible implementations, the first transmission point is a reference transmission point, and the second transmission point is a target transmission point.

In some possible implementations, the predetermined duration is sent to the terminal device by a network device through higher-layer signaling, or the predetermined duration is a duration predefined in a protocol.

In some possible implementations, the terminal device further includes a sending unit configured to send at least one of the following information to the positioning device: frequency drift rate over time, phase drift rate over time, and phase drift over time.

In some possible implementations, the determining unit is configured to determine the phase difference based on the first phase observation value, the second phase observation value, and the phase drift over time.

In some possible implementations, both the first and second transmission points are reference transmission points, and a transmission point i is a target transmission point. A phase difference between the first transmission point and the transmission point i is determined based on the following formula:

$$\emptyset^{i,1} = \emptyset^{i,2} - \emptyset^{1,2}$$

In the above formula, $\emptyset^{i,1}$ represents the phase difference between transmission point i and the first transmission point, $\emptyset^{i,2}$ represents a phase difference between the transmission point i and the second transmission point, and $\emptyset^{1,2}$ represents a phase difference between the first transmission point and the second transmission point.

In some possible implementations, the receiving unit is further configured to receive a request message sent by the positioning device.

The terminal device further includes a sending unit. In response to the request message, the sending unit sends at least one of the following information: the phase difference between the first transmission point and the second transmission point, the first phase observation value, and the second phase observation value.

Figure 7:
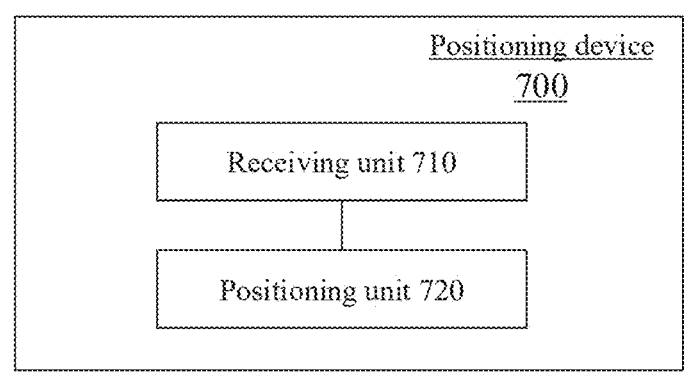
FIG. 7 illustrates a block diagram of a positioning device according to an embodiment of the present disclosure.

FIG. 7 illustrates a block diagram of a positioning device according to an embodiment of the present disclosure. The positioning device shown in FIG. 7 may include a receiving unit 710 and a positioning unit 720.

The receiving unit 710 is configured to receive a phase difference sent by a terminal device. The phase difference is determined based on a first phase observation value and a second phase observation value. The first phase observation value is obtained by the terminal device measuring a first reference signal transmitted by a first transmission point. The second phase observation value is obtained by the terminal device measuring a second reference signal transmitted by a second transmission point.

The positioning unit 720 is configured for positioning of the terminal device based on the phase difference.

A reception time of the first reference signal is a first time instance, a reception time of the second reference signal is a second time instance, and a time interval between the first time instance and the second time instance is less than or equal to a predetermined duration.

In some possible implementations, the predetermined duration is determined based on a first time unit including at least one of the following: subframe, slot, and symbol.

In some possible implementations, the first time instance and the second time instance are within the same first time unit.

In some possible implementations, the first time instance and the second time instance are in different first time units. The second reference signal is one of reference signals transmitted by the second transmission point that is closest in time to the reception time of the first reference signal, or the first reference signal is one of reference signals transmitted by the first transmission point that is closest in time to the reception time of the second reference signal.

In some possible implementations, the receiving unit is further configured to receive at least one of the first phase observation value and the second phase observation value sent by the terminal device. The at least one of the first phase observation value and the second phase observation value is sent in response to the time interval between the first time instance and the second time instance being greater than the predetermined duration.

In some possible implementations, the predetermined duration and the first time instance are configured to determine a first time window. The receiving unit is further configured to receive at least one of the first phase observation value and a timestamp corresponding to the first phase observation value sent by the terminal device. The at least one of the first phase observation value and the timestamp corresponding to the first phase observation value is sent by the terminal device in response to the terminal device failing to detect the second reference signal within the first time window.

In some possible implementations, the predetermined duration and the second time instance are configured to determine a second time window. The receiving unit is further configured to receive at least one of a first indication message and a second indication message sent by the terminal device. The at least one of the first indication message and the second indication message is sent by the terminal device in response to the terminal device failing to detect the first reference signal within the second time window. The first indication message is configured to indicate detection failure, and the second indication message is configured to indicate that the first reference signal is not contained in the second time window.

In some possible implementations, the first transmission point is a reference transmission point, and the second transmission point is a target transmission point.

In some possible implementations, the predetermined duration is sent to the terminal device by the network device through higher-layer signaling, or the predetermined duration is a duration predefined in a protocol.

In some possible implementations, the receiving unit is further configured to receive at least one of the following information sent by the terminal device: frequency drift rate over time, phase drift rate over time, and phase drift over time.

In some possible implementations, the phase difference is determined based on the first phase observation value, the second phase observation value, and the phase drift over time.

In some possible implementations, both the first and second transmission points are reference transmission points, and the transmission point i is a target transmission point. A phase difference between the first transmission point and the transmission point i is determined based on the following formula:

$$\phi^{i,1} = \phi^{i,2} - \phi^{1,2}$$

In the above formula, $\phi^{i,1}$ represents the phase difference between the transmission point i and the first transmission point, $\phi^{i,2}$ represents a phase difference between the transmission point i and the second transmission point, and $\phi^{1,2}$ represents a phase difference between the first transmission point and the second transmission point.

In some possible implementations, the positioning device further includes a sending unit configured to send a request message to the terminal device. The request message is configured to request the terminal device to send at least one of the following information: the phase difference between the first transmission point and the second transmission point, the first phase observation value, and the second phase observation value.

Figure 8:
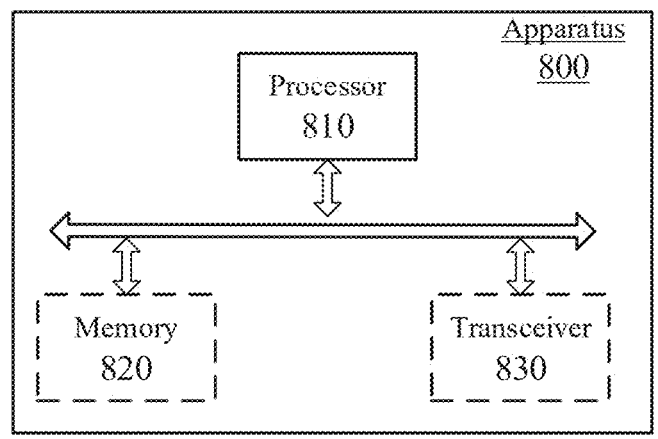
FIG. 8 illustrates a structural diagram of a communication apparatus according to an embodiment of the present disclosure.

FIG. 8 illustrates a structural diagram of a communication apparatus according to an embodiment of the present disclosure. The dashed lines in FIG. 8 indicate that the units or modules are optional. The apparatus 800 may be configured to implement the methods described in the above method embodiments. The apparatus 800 may be a chip, a terminal device, a network device, or a positioning device.

The apparatus 800 may include at least one processors 810. The processor 810 may support the apparatus 800 to implement the methods described in the above method embodiments. The processor 810 may be a general-purpose processor or a dedicated processor. For example, the processor may be a central processing unit (CPU). Alternatively, the processor may also be other general-purpose processors, digital signal processors (DSP), disclosure-specific integrated circuits (ASIC), field-programmable gate arrays (FPGA), or other programmable logic devices, discrete gate or transistor logic devices, discrete hardware components, etc. General-purpose processors may be microprocessors or any conventional processors.

The apparatus 800 may also include at least one memory 820. The at least one memory 820 stores a program that may be executed by the processor 810 to cause the processor 810 to execute the methods described in the method embodiments. The at least one memory 820 may be independent of the processor 810 or integrated into the processor 810.

The apparatus 800 may also include a transceiver 830. The processor 810 may communicate with other devices or chips through the transceiver 830. For example, the processor 810 may send and receive data to/from other devices or chips through the transceiver 830.

The present disclosure also provides a computer-readable storage medium for storing a program. The computer-readable storage medium may be applied to the terminal device or the positioning device described in the present disclosure. The program causes a computer to execute the methods executed by the terminal device or the positioning device described in the various embodiments of the present disclosure.

The present disclosure also provides a computer program product. The computer program product includes a program. The computer program product may be applied to the terminal device or the positioning device described in the present disclosure. The program causes a computer to execute the methods executed by the terminal device or the positioning device described in the various embodiments of the present disclosure.

The present disclosure also provides a computer program. The computer program may be applied to the terminal device or the positioning device described in the present disclosure. The computer program causes a computer to execute the methods executed by the terminal device or the positioning device described in the various embodiments of the present disclosure.

It should be understood that the terms "system" and "network" may be used interchangeably in the present disclosure. Additionally, the terms used in the present disclosure are only for explaining the specific embodiments of the present disclosure and are not intended to limit the present disclosure. The terms "first," "second," "third," and "fourth" used in the present disclosure are used to distinguish different objects and are not used to describe a specific order. Furthermore, the terms "include," "comprise," and "have" as well as their any variations are intended to cover non-exclusive inclusions.

In the embodiments of the present disclosure, the term "indicate" may be direct indication, indirect indication, or indication of an associated relationship. For example, A indicating B may mean that A directly indicates B (e.g., B may be obtained directly from A); or may also mean that A indirectly indicates B (e.g., A indicates C, and B may be obtained by C); or may also mean that A and B have an associated relationship.

In the embodiments of the present disclosure, the term "comprise" or "include" may refer to direct inclusion or indirect inclusion. Optionally, the term "comprise" or "include" used in the present disclosure may be replaced with "indicate" or "used to determine." For example, A including B may be replaced with A indicating B or A being used to determine B.

In the embodiments of the present disclosure, "B corresponding to A" means that B is associated with A, and B may be determined based on A. However, it should also be understood that determining B based on A does not mean that B is determined based on only A, that is, B may also be determined based on A and/or other information.

In the embodiments of the present disclosure, the term "correspond" may indicate a direct or indirect corresponding relationship, an associated relationship, or an indicating and being indicated relationship, a configuring and being configured relationship, etc.

In the embodiments of the present disclosure, "predefined" or "preconfigured" may be implemented by pre-saving corresponding codes, tables, or other means for indicating relevant information in devices (such as terminal devices and network devices). The present disclosure does not specifically limit the implementation method. For example, predefined may mean defined in a protocol.

In the embodiments of the present disclosure, the term "protocol" may refer to standard protocols in the field of communication, such as LTE protocol, NR protocol, and protocols for future communication systems. The present disclosure does not specifically limit this.

In the embodiments of the present disclosure, the term "and/or" merely indicates a relationship between associated objects, meaning that there may be three relationships: A and B, A or B, and B or A. Additionally, the character "/" in the present disclosure generally indicates an "or" relationship between the associated objects.

In the various embodiments of the present disclosure, the processes described should be understood that the sequence numbers do not necessarily indicate the order of execution. The execution order of the processes should be determined based on their functions and inherent logic, and should not be limited by the order described in the present disclosure.

In the several embodiments provided in the present disclosure, it should be understood that the disclosed systems, devices, and methods may be implemented in other ways. For example, the device embodiments described above are merely illustrative. For example, the division of units is merely a logical function division, and the actual implementation may have other division methods. For example, multiple units or components may be combined or integrated into another system, or some features may be ignored or not executed. Another point is that the coupling or direct coupling or communication connection displayed or discussed between the various units may be indirect coupling or communication connection through some interfaces, devices, or units, and may be electrical, mechanical, or other forms.

The units described as separate components may be or may not be physically separated. The components displayed as units may be or may not be physical units. That is, they may be located in one place or distributed across multiple network units. Depending on the actual needs, some or all of the units may be selected to achieve the objectives of the embodiments of the present disclosure.

Additionally, in the various embodiments of the present disclosure, each functional unit may be integrated into one processing unit, or each unit may exist separately, or two or more units may be integrated into one unit.

In the above embodiments, the methods may be fully or partially implemented through software, hardware, firmware, or any combination thereof. When implemented through software, the methods may be fully or partially realized in the form of a computer program product. The computer program product includes at least one computer instructions. When the computer program instructions are loaded and executed on a computer, the processes or functions described in the embodiments of the present disclosure are fully or partially generated. The computer may be a general-purpose computer, a dedicated computer, a computer network, or any other programmable device. The computer instructions may be stored in a computer-readable storage medium or transmitted from one computer-readable storage medium to another. For example, the computer instructions may be transmitted from a website, a computer, a server, or a data center to another website, computer, server, or data center through wired (e.g., coaxial cable, fiber optic, digital subscriber line (DSL)) or wireless (e.g., infrared, wireless, microwave) means. The computer-readable storage medium may be any available medium that may be read by a computer or a data storage device integrated from at least one available media, such as a server or data center. The available media may be magnetic media (e.g., floppy disk, hard disk, magnetic tape), optical media (e.g., digital video disc (DVD)), or semiconductor media (e.g., solid-state disk (SSD)).

The above description is merely a specific implementation manner of the present disclosure. However, the protection scope of the present disclosure is not limited to this. Any changes or substitutions that can be easily conceived by those skilled in the technical field within the technical scope disclosed by the present disclosure should be covered within the protection scope of the present disclosure. Therefore, the protection scope of the present disclosure should be subject to the protection scope of the claims.

What is claimed is:

1. A method, comprising:
   receiving, by a terminal device, a first reference signal transmitted by a first transmission point;
   measuring, by the terminal device, the first reference signal to obtain a first phase observation value;
   receiving, by the terminal device, a second reference signal transmitted by a second transmission point;
   measuring, by the terminal device, the second reference signal to obtain a second phase observation value; and
   determining, by the terminal device, a phase difference based on the first phase observation value and the second phase observation value, wherein the phase difference is used to determine a position of the terminal device;
   wherein a reception time of the first reference signal is a first time instance, a reception time of the second reference signal is a second time instance, and a time interval between the first time instance and the second time instance is less than or equal to a predetermined duration.

2. The method of claim 1, wherein the predetermined duration is determined based on a first time unit including at least one of subframe, slot, or symbol.

3. The method of claim 2, wherein the first time instance and the second time instance are within the same first time unit.

4. The method of claim 2, wherein the first time instance and the second time instance are in different first time units, and the second reference signal is one of reference signals transmitted by the second transmission point that is closest in time to the reception time of the first reference signal, or the first reference signal is one of reference signals transmitted by the first transmission point that is closest in time to the reception time of the second reference signal.

5. The method of claim 1, further comprising:
   performing, by the terminal device, a first operation in response to the time interval between the first time instance and the second time instance being greater than the predetermined duration, wherein the first operation includes at least one of the following:
   determining whether to send the phase difference;
   sending the first phase observation value; or
   sending the second phase observation value.

6. The method of claim 1, wherein the predetermined duration and the first time instance are used to determine a first time window, and wherein the method further comprises:

sending, by the terminal device, at least one of the first phase observation value or a timestamp corresponding to the first phase observation value to a positioning device in response to the terminal device failing to detect the second reference signal within the first time window.

7. The method of claim 1, wherein the predetermined duration and the second time instance are used to determine a second time window, and wherein the method further comprises:
   performing, by the terminal device, a second operation in response to the terminal device failing to detect the first reference signal within the second time window, wherein the second operation includes at least one of the following:
   refraining from sending the second phase observation value;
   sending a first indication message that indicates detection failure; or
   sending a second indication message, wherein the second indication message indicates that the first reference signal is not contained in the second time window.

8. The method of claim 6, wherein the first transmission point is a reference transmission point, and the second transmission point is a target transmission point.

9. The method of claim 6, wherein the predetermined duration is sent to the terminal device by a network device through higher-layer signaling, or the predetermined duration is a duration predefined in a protocol.

10. The method of claim 1, further comprising:
    sending, by the terminal device, at least one of the following information to a positioning device: frequency drift rate over time, phase drift rate over time, or phase drift over time.

11. The method of claim 1, wherein determining, by the terminal device, the phase difference based on the first phase observation value and the second phase observation value includes:
    determining, by the terminal device, the phase difference based on the first phase observation value, the second phase observation value, and phase drift over time.

12. The method of claim 1, wherein both the first and second transmission points are reference transmission points, and a transmission point i is a target transmission point, wherein a phase difference between the first transmission point and the transmission point i is determined based on the following formula:

$$\emptyset^{i,1} = \emptyset^{i,2} - \emptyset^{1,2}$$

wherein $\emptyset^{i,1}$ represents the phase difference between the transmission point i and the first transmission point, $\emptyset^{i,2}$ represents a phase difference between the transmission point i and the second transmission point, and $\emptyset^{1,2}$ represents a phase difference between the first transmission point and the second transmission point.

13. The method of claim 12, further comprising:
    receiving, by the terminal device, a request message sent by a positioning device; and
    in response to the request message, sending, by the terminal device, at least one of the following information to the positioning device: the phase difference between the first transmission point and the second transmission point, the first phase observation value, or the second phase observation value.

14. A method, comprising:
receiving, by a positioning device, a phase difference sent by a terminal device, wherein the phase difference is determined based on a first phase observation value and a second phase observation value, the first phase observation value is obtained by the terminal device measuring a first reference signal transmitted by a first transmission point, and the second phase observation value is obtained by the terminal device measuring a second reference signal transmitted by a second transmission point; and
determining, by the positioning device, a position of the terminal device based on the phase difference;
wherein a reception time of the first reference signal is a first time instance, a reception time of the second reference signal is a second time instance, and a time interval between the first time instance and the second time instance is less than or equal to a predetermined duration.

15. An apparatus, comprising:
at least one processor; and
one or more non-transitory computer-readable storage media coupled to the at least one processor and storing programming instructions for execution by the at least one processor, wherein the programming instructions, when executed, cause the apparatus to perform operations comprising:
receiving a first reference signal transmitted by a first transmission point;
measuring the first reference signal to obtain a first phase observation value;
receiving a second reference signal transmitted by a second transmission point;
measuring the second reference signal to obtain a second phase observation value; and
determining a phase difference based on the first phase observation value and the second phase observation value, wherein the phase difference is used to determine a position of a terminal device;
wherein a reception time of the first reference signal is a first time instance, a reception time of the second reference signal is a second time instance, and a time interval between the first time instance and the second time instance is less than or equal to a predetermined duration.

16. The apparatus of claim 15, wherein the predetermined duration is determined based on a first time unit including at least one of subframe, slot, or symbol.

17. The apparatus of claim 16, wherein the first time instance and the second time instance are within the same first time unit.

18. The apparatus of claim 16, wherein the first time instance and the second time instance are in different first time units, and the second reference signal is one of reference signals transmitted by the second transmission point that is closest in time to the reception time of the first reference signal, or the first reference signal is one of reference signals transmitted by the first transmission point that is closest in time to the reception time of the second reference signal.

19. The apparatus of claim 15, the operations further comprising:
performing a first operation in response to the time interval between the first time instance and the second time instance being greater than the predetermined duration, wherein the first operation includes at least one of the following:
determining whether to send the phase difference;
sending the first phase observation value; or
sending the second phase observation value.

20. The apparatus of claim 15, wherein the predetermined duration and the first time instance are used to determine a first time window, and wherein the operation further comprise:
sending at least one of the first phase observation value or a timestamp corresponding to the first phase observation value to a positioning device in response to the terminal device failing to detect the second reference signal within the first time window.

* * * * *